UNITED STATES PATENT OFFICE.

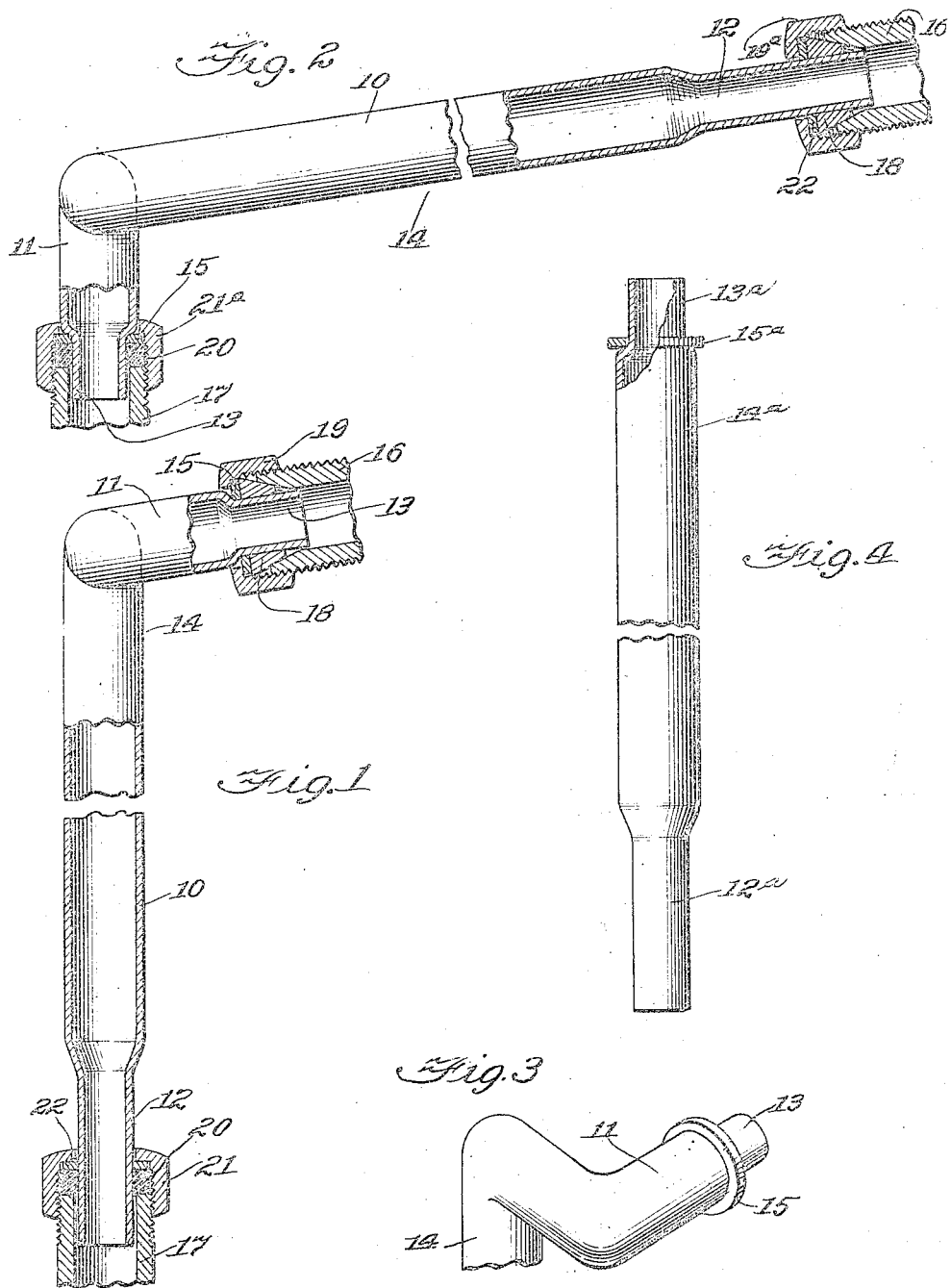

JOSEPH H. GLAUBER, OF CLEVELAND, OHIO.

COUPLING-PIPE.

980,939.  Specification of Letters Patent.  Patented Jan. 10, 1911.

Application filed December 10, 1909. Serial No. 532,359.

*To all whom it may concern:*

Be it known that I, JOSEPH H. GLAUBER, a citizen of the United States, residing at Cleveland, in the county of Cuyahoga and State of Ohio, have invented new and useful Improvements in Coupling-Pipes, of which the following is a full, clear, concise, and exact description, reference being had to the accompanying drawing, forming a part of this specification.

This invention relates to coupling pipes such as are employed in making connection between service pipes and the faucets of bath tubs, wash basins and the like.

In a patent granted to me February 14th, 1905, No. 782,552, I have shown a coupling pipe for open plumbing work designed for connecting the service pipe with a faucet of a bath tub or wash basin, the pipe being made of a single piece of tubing of substantially uniform cross-section from end to end, and designed to have its ends telescoped into a service pipe and the spud of the faucet connected thereto. The coupling pipe of that patent possesses the advantage of being of a single piece of tubing and avoids the disadvantages of the threaded built-up coupling pipes having numerous joints subject to leakage which were universally used prior to the invention of the coupling pipe of the above-mentioned patent. In view of the fact, however, that the single piece coupling pipe of the patent referred to is of the same diameter throughout its length, such diameter being that of the ends which telescope into the service pipe and faucet spud, it is comparatively slender and contracted and does not possess the massive and substantial appearance of the full-size piping of the built-up style of coupling pipe.

The object of the present invention is to provide a coupling pipe which possesses the advantages of the coupling pipe of my former patent and at the same time has the massive and substantial appearance of the built-up coupling pipe, and which possesses the further advantage, inasmuch as the body portion may be of the size of the built-up connections, of permitting the use of standard size threaded fittings, such as stop cocks, air chambers, etc., sometimes used in the built-up connections, should it be desired to employ the same with the coupling pipe.

To this end my invention comprises a single piece coupling pipe consisting of end portions of substantially the same diameter and a body portion of greater diameter than said ends, each of the reduced ends being so formed that it may telescope into the service pipe or the faucet spud, as the case may be, the pipe being reversible end for end so that whichever end it is desired to have adjustable with respect to the part with which it is to be connected may be inserted into said part, while that portion of the coupling pipe which is exposed when the device is in use may be of the same or substantially the same size as the ordinary coupling pipe.

In the accompanying drawings—Figure 1 is a view, partially sectional, of an elbow form of coupling pipe embodying my invention, showing the shorter arm thereof connected to a faucet spud and the longer arm to a service pipe; Fig. 2 is a similar view but with the coupling pipe reversed, the longer arm being connected to the faucet spud and the other arm to the service pipe; Fig. 3 is a detail view in perspective of one end of the coupling pipe; and Fig. 4 illustrates a straight coupling pipe embodying my invention.

In the embodiment of the invention illustrated in Fig. 1, the coupling pipe is of the elbow pattern and is made of a single piece of tubing, in that it is free from joints or separable connections between its ends. Obviously the coupling pipe might be made up of two or more parts welded, brazed, or otherwise permanently secured together so as to be in effect a single piece tube or pipe. The coupling pipe shown in Fig. 1 is provided with arms of unequal length extending from the elbow, the longer arm being designated 10 and the shorter arm 11. The ends 12 and 13 of the coupling pipe are of such diameter as to readily telescope into the usual service pipe and faucet spud with which the coupling pipe is to be associated, as in the patent heretofore mentioned, and between such ends the pipe is enlarged in diameter, such enlarged portion constituting the body portion 14 of the pipe.

In the embodiment of the invention illustrated in Figs. 1 and 2, the shorter arm 11 of the coupling pipe is provided with a collar 15 at the inner end of the reduced end 13 of the pipe, such reduced end being of such diameter as to readily telescope into the spud of an ordinary faucet or service pipe. The collar 15 may be sweated, brazed or threaded on the coupling pipe or it may be developed from the pipe itself. The reduced end 12 at the other end of the coupling pipe is likewise of such diameter as to readily telescope into an ordinary service pipe or faucet spud, and in order to allow for the telescoping of such end to the necessary degree to insure proper connection irrespective of the extent to which the end of the service pipe may extend above the floor or the height of the faucet from the end of the service pipe, which conditions vary in different installations, the reduced end 12 is of such length as to adapt the coupling pipe to a wide variation in the conditions mentioned.

In Fig. 1 the coupling pipe is shown connecting the spud 16 of an ordinary faucet with a service pipe 17. The rear end of the faucet spud has an inwardly tapering seating portion, as is usual with such devices, and in the tapered end fits a cone-shaped seat or gasket 18, which may be of rubber or other suitable compressible material, including lead or other soft metal. This seat 18 is seated against the collar 15, and when the coupling nut 19 of the faucet which makes screw-threaded engagement with the spud 16 is screwed firmly against the collar, the seat 18 is forced into the tapered space between the reduced end of the pipe and the interior of the spud. The engagement of the inturned flange of the nut 19 with the collar 15 draws the coupling pipe toward the faucet and clamps the parts firmly together. A water-tight joint is thus formed between this end of the coupling pipe and the faucet. The opposite end 12 of the coupling pipe is of a reduced diameter for a suitable length, as already explained, and in Fig. 1 is shown inserted into the service pipe 17, and it is evident that the same may be extended into the service pipe for a greater or less distance, as required by existing conditions, considerable latitude in this respect being afforded to meet the varying conditions of installation.

Surrounding the reduced end 12 of the coupling pipe is a washer 20 of suitable material, such as lead or other soft metal, or even rubber, if preferred, this washer being so disposed as to seat itself against the end of the service pipe. A coupling nut 21 engages with suitable threads upon the exterior of the service pipe and between the inturned flange of this nut and the washer 20 may be inserted a metallic swivel washer 22. When the nut 21 is firmly screwed down, the washer 20 is compressed and made to hug the coupling pipe, a water-tight joint being thus made.

In Fig. 2 the coupling pipe is shown as reversed; that is, the end 12 is inserted in the faucet spud and the end 13 in the service pipe 17, to adapt the coupling pipe to other conditions than those shown in Fig. 1, as when the service pipe is brought up through the wall or partition back of the basin or bath tub. When connected under such conditions, the seat 18 is placed on the end 12, which is then inserted to the proper degree in the faucet spud, and connected to such spud by a suitable nut 19$^a$ which engages the threads of the spud and, reacting against the swivel washer 22, clamps the seat 18 against the tapering seat in the spud. The other end, or 13, enters the service pipe 17 and connection with such pipe is made by a suitable nut 21$^a$ which, reacting against the collar 15, compresses the washer 20 against the end of the service pipe.

In the particular form of coupling pipe shown in Figs. 1 and 2, the short arm 11 is offset laterally from the long arm 14, as shown in Fig. 3, to adapt the coupling pipe to installations where the faucets are offset laterally from the line of the service pipes. This, however, is not material, as various modifications may be made without departing from the spirit of my invention. Nor is it essential that the pipe be of elbow pattern. For example, for certain installations the coupling pipe may be made straight, as shown in Fig 4. In this figure the enlarged body portion designated 14$^a$ is provided at one end with a reduced portion 12$^a$ corresponding to 12 of Fig. 1, and at the other end with a reduced portion 13$^a$ corresponding with the end 13 of Fig. 1, the latter end being also provided with a collar 15$^a$, similar to the collar 15 of Fig. 1. In other words, the coupling pipe of Fig. 4 is similar to that of Fig. 1, except that it is straight instead of elbow form. This form of the coupling pipe may be employed with certain styles of faucets the spuds of which extend through the basin slab, and is connected up with the faucet and service pipe in the same manner as the coupling pipe shown in Fig. 1. As both ends of the pipe telescope into the parts to which they are adapted to be associated, and are securely held in place by means of the collar 15, there is no danger of either end of the pipe blowing out.

When the coupling pipe of my invention is in use the enlarged body portion only is visible, except possibly a small part of the reduced end 12 that may be exposed in the event that the installing conditions are such that the end 12 is not entirely telescoped into the pipe or faucet spud with which it is connected. Therefore, while all of the advantages of the coupling pipe of my former patent are retained, the coupling pipe of the present application does not have the contracted appearance due to the reduced diameter of the coupling pipe of that patent, but presents the massive and substantial appearance of the built-up coupling pipe. Moreover, with the coupling pipe of my present invention it is possible to have the body of the coupling pipe of standard pipe sizes so that it may be cut through and standard size stop cocks, air chambers, and other fittings may be inserted and permanently connected up in the body of the coupling pipe.

The coupling pipe is preferably made of annealed metal, so that it may be bent to conform to other conditions of installation, such as misalinement of the service pipes and faucets.

Having thus described my invention, what I claim as new and desire to secure by Letters Patent, is:—

1. As an article of manufacture, a single piece coupling pipe comprising a body portion provided with ends of reduced diameter adapted to telescope into and connect a service pipe and a faucet spud, the said body portion being of substantially uniform diameter between the reduced ends, a collar at one of the reduced ends and compression nuts for connecting the ends to the service pipe and faucet spud, one of said compression nuts coöperating with said collar.

2. As an article of manufacture, a single piece coupling pipe of elbow form having arms of unequal length, the said arms terminating in reduced ends either of which is adapted to telescope into a service pipe or faucet spud to be connected thereby and the shorter arm having a collar at the inner end of its reduced portion, the body of the pipe between the reduced ends being of substantially uniform diameter, and a compression nut for each end of the pipe.

In witness whereof, I have hereunto subscribed my name in the presence of two witnesses.

JOSEPH H. GLAUBER.

Witnesses:
T. C. DOOLITTLE,
C. W. BRENNAN.